United States Patent
Meyer

(10) Patent No.: US 6,867,887 B1
(45) Date of Patent: Mar. 15, 2005

(54) PHOTOGRAPH FACSIMILE APPARATUS AND METHOD

(75) Inventor: John F. Meyer, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/304,565

(22) Filed: May 4, 1999

(51) Int. Cl.[7] .................................................. H04N 1/46
(52) U.S. Cl. ....................... 358/500; 358/501; 358/527; 358/302; 358/909.1; 358/906; 379/100.01
(58) Field of Search ............................... 358/500, 527, 358/401, 501, 471, 302, 1.12, 442, 448, 202, 909.1, 505, 906; 379/100.01; 348/207

(56) References Cited

U.S. PATENT DOCUMENTS

| | | | |
|---|---|---|---|
| 2,658,102 A | | 11/1953 | Goldsmith |
| 3,657,471 A | | 4/1972 | Sasabe et al. |
| 4,074,324 A | * | 2/1978 | Barrett |
| 4,258,387 A | | 3/1981 | Lemelson et al. |
| 4,587,633 A | | 5/1986 | Wang et al. |
| 4,652,937 A | * | 3/1987 | Shimura et al. |
| 4,888,648 A | | 12/1989 | Takeuchi et al. |
| 5,172,243 A | | 12/1992 | Hayashi et al. |
| 5,265,152 A | * | 11/1993 | Kotani et al. ................ 379/100 |
| 5,272,549 A | | 12/1993 | McDonald |
| 5,327,265 A | | 7/1994 | McDonald |
| 5,379,121 A | * | 1/1995 | Yamada et al. |
| 5,550,646 A | * | 8/1996 | Hassan et al. ............... 358/442 |
| 5,587,735 A | * | 12/1996 | Ishida et al. |
| 5,606,420 A | * | 2/1997 | Maeda et al. |
| 5,666,159 A | | 9/1997 | Parulski et al. |
| 5,757,388 A | * | 5/1998 | Stephenson |
| 5,799,068 A | * | 8/1998 | Kikinis et al. ............ 379/93.06 |
| 5,835,136 A | * | 11/1998 | Watanabe et al. |
| 5,927,872 A | * | 7/1999 | Yamada ........................ 400/88 |
| 5,956,162 A | * | 9/1999 | Nobuta ........................ 358/500 |
| 5,978,609 A | * | 11/1999 | Aoki |
| 6,040,919 A | * | 3/2000 | Iwata et al. |
| 6,072,600 A | * | 6/2000 | Wertsberger |
| 6,074,111 A | * | 6/2000 | Kasahara |
| 6,094,282 A | * | 7/2000 | Hoda et al. ............... 358/909.1 |
| 6,104,430 A | * | 8/2000 | Fukuoka .................... 348/231.6 |
| 6,115,137 A | * | 9/2000 | Ozawa et al. ................ 358/1.6 |
| 6,147,770 A | * | 11/2000 | Unishi et al. ................ 358/1.2 |
| 6,167,469 A | * | 12/2000 | Safai et al. .................... 710/62 |
| 6,229,565 B1 | * | 5/2001 | Bobry |
| 6,269,357 B1 | * | 7/2001 | Nakayama et al. ............. 707/1 |
| 6,297,893 B1 | * | 10/2001 | Menaldo Moretta et al. |
| 6,305,770 B1 | * | 10/2001 | Silverbrook |
| 6,337,712 B1 | * | 1/2002 | Shiota et al. ............. 348/231.1 |
| 6,426,801 B1 | * | 7/2002 | Reed .......................... 358/1.16 |
| 6,552,743 B1 | * | 4/2003 | Rissman ..................... 348/375 |
| 6,657,657 B1 | * | 12/2003 | Sato ......................... 348/207.2 |
| 6,715,003 B1 | * | 3/2004 | Safai ............................ 710/33 |

\* cited by examiner

*Primary Examiner*—Kimberly Williams
*Assistant Examiner*—Tia Carter

(57) ABSTRACT

Apparatus and methods are disclosed for sending and receiving data such as photographic or other color images. The apparatus includes a housing and a data entry module such as a number were keypad for dialing. It also includes a recording mechanism, for example a color printer for recording data received onto the fixed medium, for example to produce color photographs.

28 Claims, 5 Drawing Sheets

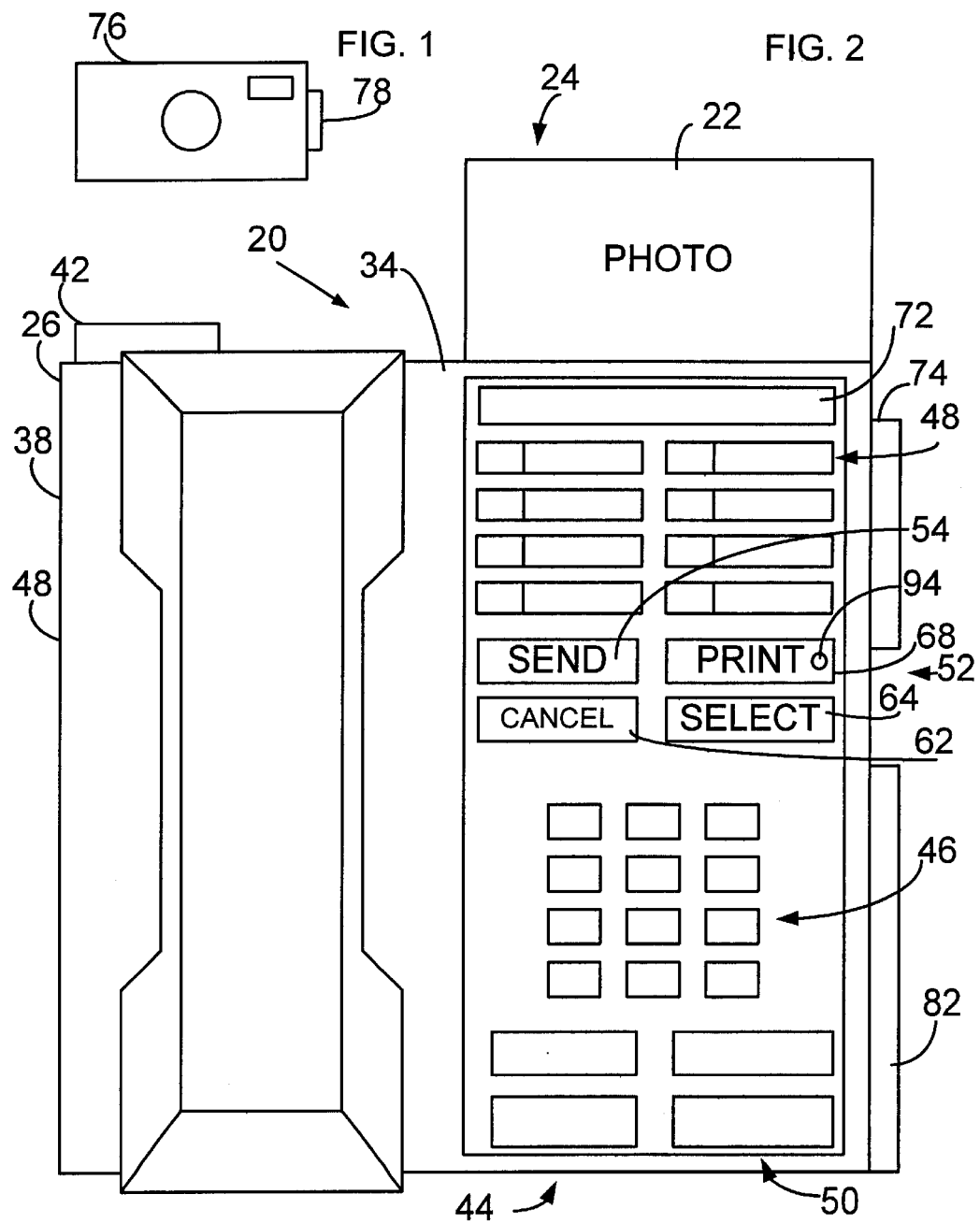

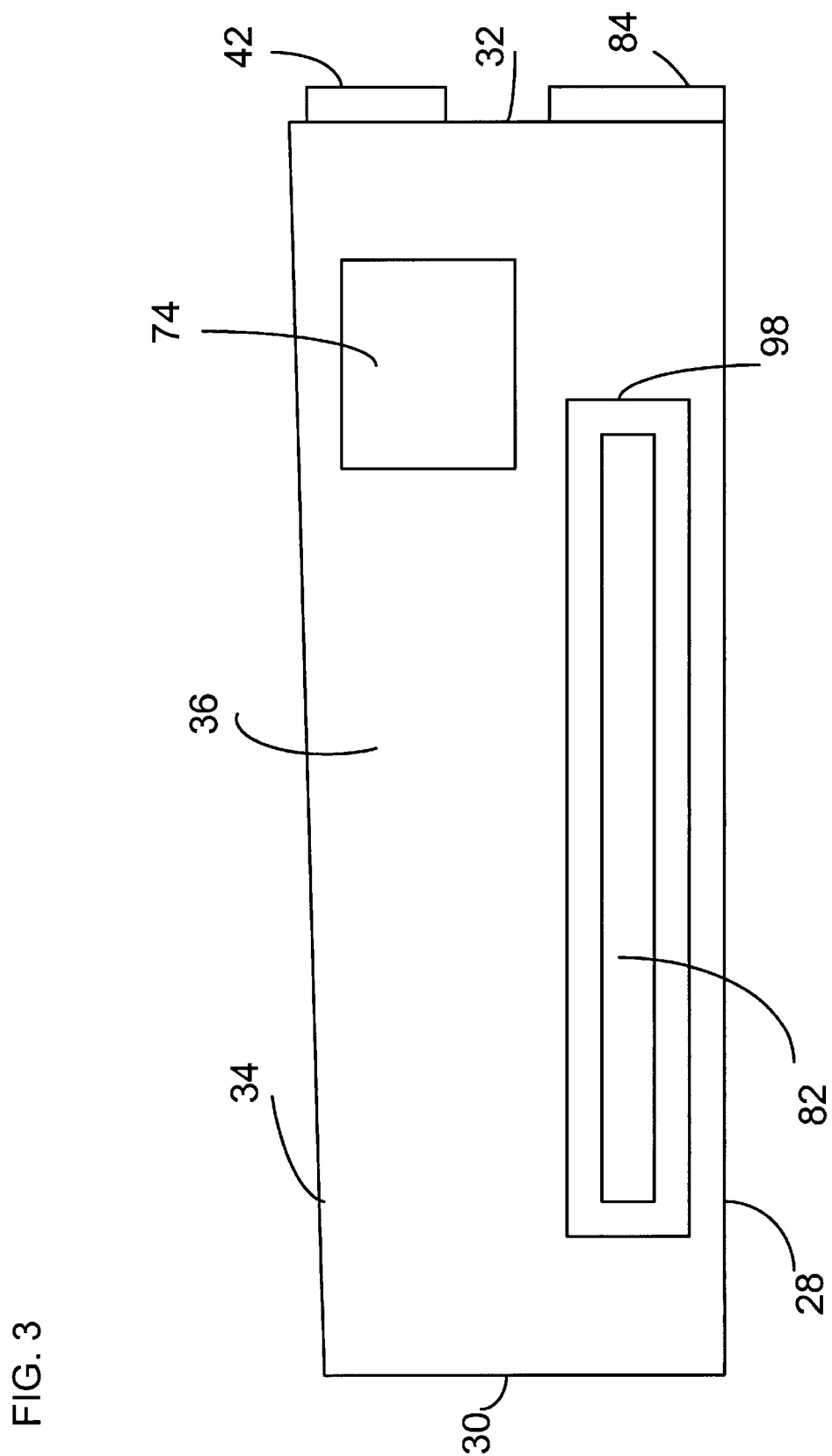

PHOTOGRAPH FACSIMILE APPARATUS AND METHOD

BACKGROUND OF THE INVENTIONS

1. Field of the Inventions

The present inventions relate to telephones and facsimile apparatus, including those that can receive data and print data such as images, as well as send and receive voice information.

2. Background of the Inventions

Facsimile machines have developed from simple data receivers and document printers to sophisticated telecommunications devices having scanners, multiple paper supply trays, extensive telephone number storage, delayed dial and redial and transmission scheduling, as well as significant memory capacity. Early facsimile machines were simple one shot devices that scanned a sheet or page and converted the scanned data to analog signals representing the information scanned from the sheet. The analog signals were sent over the telephone lines simultaneously as the sheet was being scanned. Data received over the telephone lines from an originating fax machine are converted from the original analog form from the telephone lines to signals used to control a printer to record on a sheet of paper the information scanned on the originating fax machine. The printer presents the information essentially at the same time as it is received. The paper for printing was typically thermal paper fed from a roll. These fax machines typically included a stand-alone telephone connected in line with the fax machine, or an integrated number dialing pad, along with start and stop switches and the like for controlling the fax machine.

More conventional fax machines now have programmable and delayed transmission, automatic redial, transmission monitoring, large amounts of storage for scanning and storing documents for immediate or delayed transmission and fax broadcasting. Digital displays are used for ease-of-use, display of send and receive information, error information, storage capacity and the like. Numerous selection keys are included with the standard numeric keypad for storage of automatic dial numbers and other often-used information. Large amounts of storage memory capacity are used to make these capabilities possible, such as document storage, telephone number storage, automatic redial information, and the like. Plain paper trays and plain paper printers are commonly used in conventional fax machines, and multiple paper trays are often used for different paper sizes, paper reserve, and the like. These additional capabilities typically come with increased power consumption, cost, and size for meeting the demands of customers having multiple needs.

With the increased capabilities, it is more difficult for these machines to provide quality results at the same level for all of the functions and capabilities of the multifunction fax machines without significant cost and design effort. While technology advances have improved the quality of scanning and printing of documents, especially documents containing text, fax machines have typically been designed to optimize ease-of-use for business customers, high-volume users and others requiring fast machines, high throughput and reliability. Consequently, efforts have not been devoted to designing fax machines to meet needs and uses uniquely suited for families and home users. Because of their complexity and technological advances, many conventional fax machines are too expensive, too large and over designed for many home uses, except for document and text intensive applications common to business users. Fax machines are needed which are more suitable to the needs of families wanting to transmit such data as family photographs, high-quality images such as color images and the like, and are less expensive than conventional fax machines.

SUMMARY OF THE INVENTIONS

Apparatus and methods are described which provide for sending and receiving information such as color photograph images and for printing such images on conventional photographic or other paper. These apparatus and methods can take the form of a conventional telephone set capable of receiving data such as color image information from a digital camera and converting the data to signals capable of being faxed to a receiving unit. The receiving unit can convert the incoming signals so that the information can be printed as photographs. Such apparatus require relatively little space and are relatively low-cost.

In one form of the inventions, apparatus are provided for sending and receiving data such as photographic or other color images. The apparatus includes a housing and a data entry module such as a number or keypad for dialing and a recording mechanism, for example a color printer, for placing data received onto a fixed medium. The apparatus is especially suited for receiving information representing color photographs by a fax process and printing the information as color photographs. The apparatus can take the form of a conventional telephone set having a hand set and dialing functions with fax modem transmission capabilities. The telephone set includes a color printer module and a paper supply for printing images on the paper.

In one preferred form of the invention, the apparatus includes a housing with a number keypad and a display and a conventional handset similar to conventional desk telephones having multiple line displays. A paper supply cartridge or other source of a fixed medium is included in housing for printing images on the paper and out putting the paper for the user. The paper supply can be photographic paper or conventional paper stock. In one preferred embodiment, the printer is a high-quality color printer capable of printing high-quality color images at high-resolution.

In another form of the invention, the apparatus includes a housing and a data entry module and a fax module or fax capability. A printer or other image-quality recording device is included within the housing for printing the images received. The housing also includes a way for receiving photographic images such as color images from a digital camera. The receiving mechanism may include a cable connection, a disk storage docking station for reading image information from a digital camera storage disk, an infrared data port for receiving infrared signals from a transmitter in a digital camera or other means for receiving image data in the apparatus. With this apparatus, digital photographic images can be taken with digital cameras, transferred to the apparatus of the present invention and transmitted to similar apparatus at a remote location for receipt and eventual printing. Typically, identical units would be at both locations. With this apparatus, families can take pictures and immediately transmit them to other family members at other locations, without having to wait for development, processing, digitizing or other transformation of the images. Overly sophisticated, complicated, expensive and large equipment is not required, and minimal processing can be easily carried out to provide good quality color photographs. Other applications are also possible.

BRIEF DESCRIPTION OF THE DRAWINGS

FIG. 1 is a top plan view of a telephone facsimile device that can also print color photos, in accordance with one aspect of the present inventions.

FIG. 2 is a front elevation view of a camera for producing digital data representing images that can be used in conjunction with the apparatus of the present inventions.

FIG. 3 is a side elevation view of the apparatus of FIG. 1 showing a digital data input/output port and a paper tray for holding paper to be printed with color photographs.

DETAILED DESCRIPTION OF THE PREFERRED EMBODIMENTS

Figure 4:
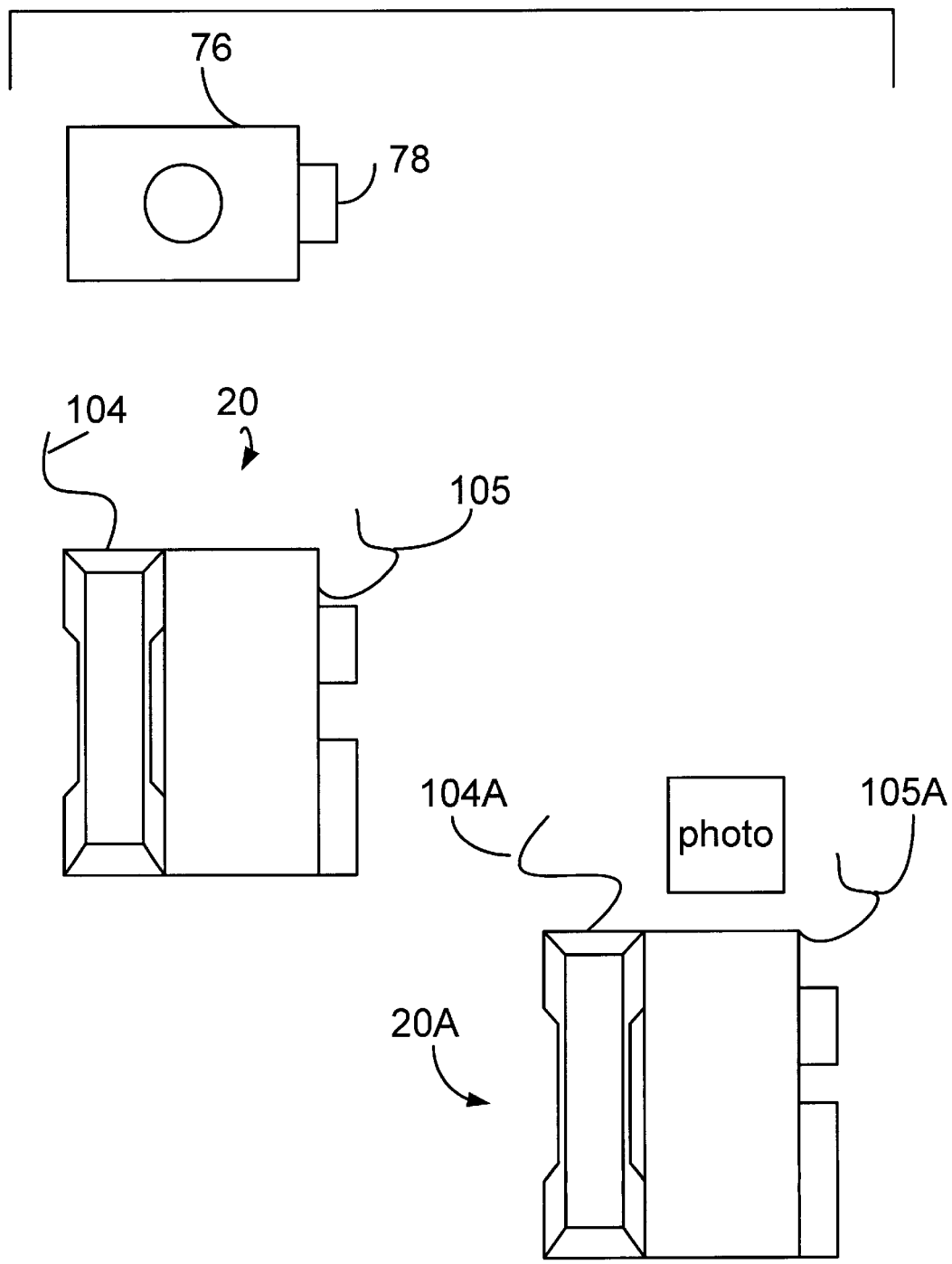
FIG. 4 is a schematic depiction of a process for transferring digital data from an imaging device such as a camera to a first device and subsequent transmission to a second device in accordance with one aspect of the present inventions.

In accordance with one or more aspects of the present inventions, apparatus and methods are described for sending and receiving information such as color photographs and printing those photographs on paper. In at least one aspect of the present inventions, the apparatus and methods of the present inventions provide a relatively compact telephone similar to ones currently used in many homes and offices and which can also send and receive digital color photographs for printing without requiring the size and all of the sophisticated components found in conventional fax machines. The apparatus can be configured to be operated without significant training, even by those unfamiliar with conventional fax machines. The units are relatively low-cost and have a number of applications such as sending family photos between family members, sending photographic information in the field, such as between military units, and exchanging photographs in police or other government agencies. These and other benefits and applications will be apparent after considering the following detailed description of the preferred embodiments and the drawings.

In a preferred embodiment, one or more of the inventions can be implemented in an apparatus or device such as fax phone 20 (FIGS. 1 and 2) for sending and receiving a photograph or other image (not shown) to be printed on a fixed medium, such as photographic paper 22 to produce the photograph 24. The fax phone is compact and relatively small in size and occupies a relatively small space on a countertop or table. The fax phone 20 can be as easy to operate as conventional telephones and is more simple that many conventional fax machines.

The fax phone includes a housing 26 having a conventional shape including a base 28 (FIG. 3), a front side 30, a back side 32, top 34, right side face 36 and left side face 38. The sides preferably have a trapezoidal shape or outline similar to many conventional desk phones so that the top face is more easily accessible and visible to the user for easier operation. The housing is preferably formed from impact resistant plastic or other suitable material and configured in a way similar to conventional phones for accepting and supporting a conventional handset 40 (not shown in FIG. 3), communicating with the electronics in the housing 26 through a conventional cord or other suitable configuration (not shown).

The fax phone also includes communications interface such as a telephone line connection or jack 42 for communicating analog and/or color digital signals between the fax phone and a remote system (not shown) such as the phone utility company or other communications service. The jack 42 would be configured to receive a conventional modular plug for a telephone cable so that the fax phone can send and receive voice communications and can also send and receive fax communications. The jack 42, as well as the connection for the hand set cord, are positioned on the housing at locations convenient for external access as well as for connection to a printed circuit board or other hardware internal to the housing for operating the fax phone. Instead of the jack 42, the communications interface may be a cable, fiber-optic, cordless transceiver module for communicating with a base station or other apparatus for communicating voice and other signals representing photographic information.

The fax phone 20 also includes a data entry assembly 44 for entering one or more items of information, such as telephone numbers, names, and the like. The data entry assembly 44 can also be used to select various functions that the fax phone can carry out. In the preferred embodiment, the data entry assembly 44 includes a conventional keypad 46 showing the conventional 10 digits and the alphabet, as well as a star or cancel key and a pound or enter key. The keypad 46 can be used to enter a destination telephone number for sending a fax. The keypad 46 can also be used to enter telephone numbers for storage where the fax phone has a number memory capability. Telephone numbers can be stored in a memory device, discussed more fully below, and retrieved through use of one or more memory keys 48. The memory keys 48 are preferably similar to speed dial or other similar memory keys on conventional phones. These keys can have single or multiple functions, just as with conventional phones. For example, multiple numbers can be stored corresponding to a given key, or a phone number can be stored in a memory register corresponding to the key when an auxiliary or select button is pressed, and another number or function may be associated with the same key when no select button is pressed. Additionally, multiple numbers can be stored in association with fewer keys or a single key, and they can be accessed simply by pressing the key multiple times. Other combinations are also possible, but more simple designs are preferred.

Depending on the functions desired for the fax phone 20, additional function keys 50 can be included or assigned, depending on the preferred design. For example, one or more of the function keys 50 can be used for selecting additional telephone lines, placing a line on hold, for redial, volume control and the like. It should also be understood that these function keys 50 as well as other keys on the fax phone can be configured to have either single or multiple functions.

Figure 6:
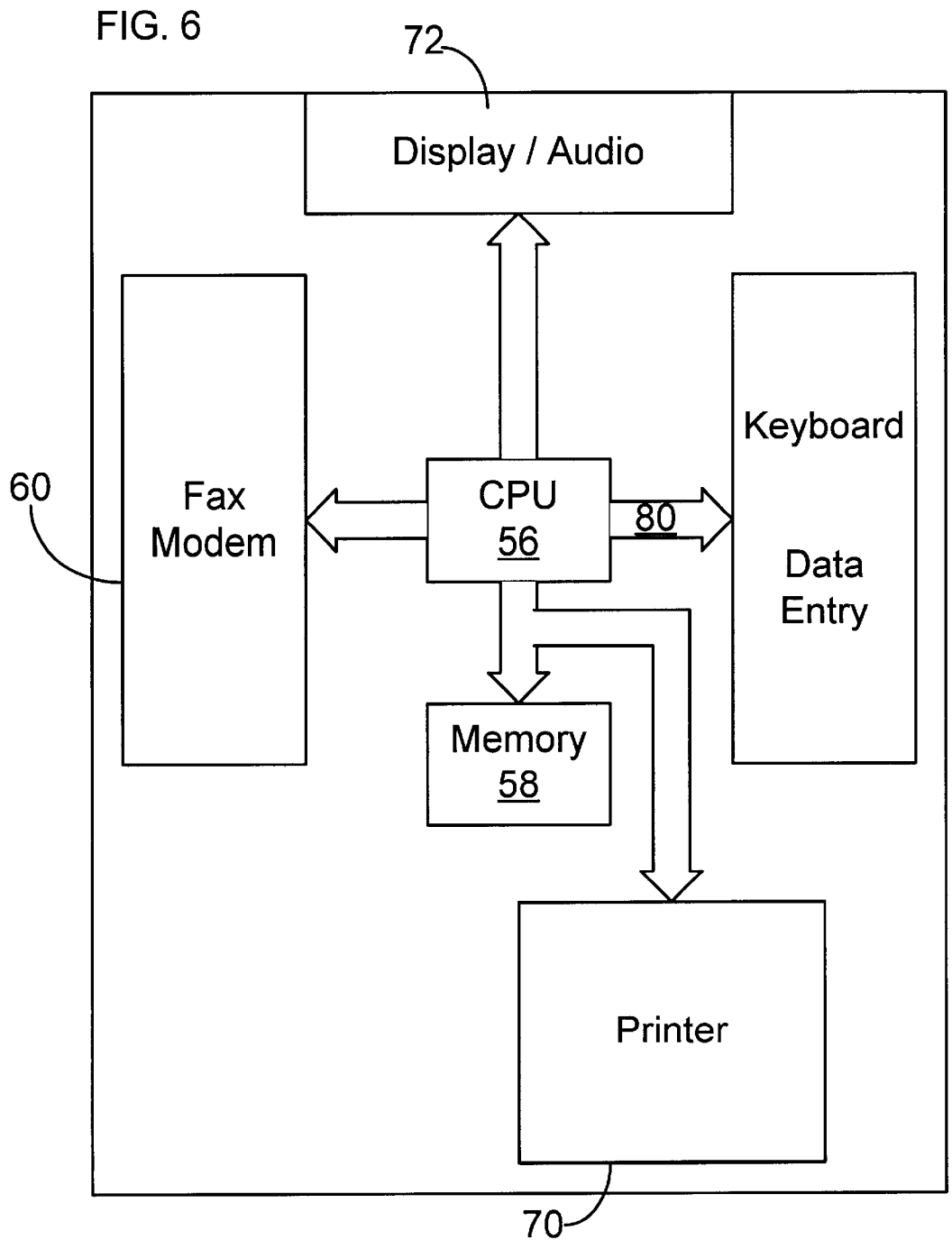
FIG. 6 is a schematic and block diagram of data devices for use in the device of FIG. 1.

The fax phone 20 also preferably includes several dedicated function keys 52 such as a send key 54 for entering a send command to the fax phone to send data from the fax phone through the interface 42 to a similar fax phone at a telephone number as entered into the keypad 46 or selected from memory. The send key 54 is similar in function and purpose to the send key on a conventional fax machine. Specifically, the send key is electronically coupled to components on the printed circuit board of the fax phone 20 to enable a dedicated processor 56 (FIG. 6) to retrieve data from memory 58 or some other data source and send the data to an output module 60 for sending the data through the interface 42 to the phone utility for being delivered to the phone number previously transmitted by the processor 56. The phone number is obtained either from memory 58, based on pressing of one or more function keys 48 and/or 50, or through entry of number selections from the keypad 46. While it is possible that information contained in memory or in a removable memory module without intervention or control using a function keys such as the send key 54, it is preferred to provide a measure of control over what, when and how images or other information are sent from the photo fax phone 20. Using the send key 54 provides a measure of certainty and reliability in the operation of the fax phone 20.

The fax phone 20 also includes another function key such as the cancel key 62 (FIG. 1) for canceling any current selections, current operations such as sending out a fax, or canceling previously entered data or selections. The cancel key 62 can also serve to reset the processor 56, reset memory registers and the like. The cancel key 62 can also be used to reverse one or more entries, as a function of the number of times the cancel key is pressed.

The fax phone may also include a select function key 64 for selecting keys to be activated for entry of data, for selecting functions, for example depending on how many times the select key is pressed, as well as other functions. In the preferred embodiment of the fax phone 20, the select key 64 is also configured to select one or more photographic images from an image source. For example, where multiple photo images are available, the select key 64 is used to identify one or more of the photo images to be stored in memory 58 or to be faxed to a selected telephone number.

The fax phone 20 also preferably includes a further function key, such as print key 68, for out putting an image onto a fixed medium, for example printing the photo 24 onto the photographic paper or other fixed medium 22 from memory 58, from an incoming data signal, or from some other source. Therefore, the print key 68 can be used to control the printing of an image coming into the fax phone through the interface 42 rather than having the image being stored in memory 58 by the processor 56. In another function, the print key 68 can be used to print a previously stored image from memory 58 through operation of the processor 56 without more, or in conjunction with selection of one or more images through the select key 64 or one or more other function keys. The print key 68 is a control which directly or indirectly sends image information through operation of the processor 56 to a printer 70 (FIG. 6) for creating a photograph. While it is possible that photographs can be printed from the fax phone automatically, or without any intervention, it is preferred to provide some level of control of the printing process from the fax phone 20.

The orientation, size and arrangement of the keypad and function keys can be selected and varied as desired. In the preferred embodiment, the keys are easily accessible for manual operation and easily distinguishable one from the other so that they can be operated by people having different capabilities. The keypad can be formed with any number of designs, such as membrane switches and the like. The keys can be labeled in any desired manner, and can even be labeled using codes or other indicia to minimize the possibility of unauthorized use. Therefore, one or more of the keys can be labeled differently than as shown in FIG. 1 but still carry out the same or similar functions.

The fax phone 20 also preferably includes a human perceptible output such as a display 72 for providing information to a user. The display may indicate that a photo is waiting to be sent or to be printed, identify a number being dialed, identify a caller, identify the source of any photo data stored in memory, display the time, date or other information. The display would also be used to display information stored in memory to permit easy use of the fax phone. For example, the display would provide instructions for using various parts of the fax phone, such as printer options, fax options and calling options. The display can also be used while entering data for storage, configuring the fax phone according to frequent operations, preferred settings, number storage and the like. The display can be a multiple line display with any desired configuration, capacity and the like. The display can be illuminated, and can have all the features, functions and capabilities of displays on conventional phones, as well as some or all of the features, functions and capabilities of displays on conventional fax machines. The display can also be operated using one or more of the function keys on the fax phone.

The output may also include, as part of the display 74 or separately, an audio output such as a voice module for audibly indicating information to the user. For example, the output may be an announcement of the remote site to which an image file is being sent. It may also announce that an image has been received from a site for which the identification has been recorded in memory. It may supplement or duplicate functions of the visual display as well.

In accordance with a further aspect of the present inventions, the fax phone 20 preferably includes one or more image data interfaces 74 for receiving image data from a camera 76 or from some other image source. In one preferred embodiment, the camera is a digital camera having a memory module such as a flash disk module 78, shown on the side of the camera 76 in FIG. 2. However, it should be understood that the memory module 78 can be located in any convenient location on the camera. The data interfaces 74 on the fax phone 20, in this embodiment of the inventions, is complementary to and configured to accept the flash disk module 78 so that the image data on the module 78 can be retrieved from the module 74 and transferred to the processor 56. The image data interfaces 74 is preferably a passive interconnection between the fax phone 20 and the memory module 78. The image data interfaces 74 include conventional contacts or connections for permitting transfer of data from the memory module 78 to the processor 56 along bus 80 under the control of processor 56.

The image data interfaces 74 can also be a removable cable connection to the camera 76 for transferring image data from the camera to the processor 56 through the interfaces 74. The interfaces 74 are still preferably formed as a passive interface or connection for transferring the digital image information from the camera 76 to the processor 56. Other forms of the interfaces 74 may include an infrared receiver and/or transmitter similar to those available with digital cameras. In many circumstances, the digital color image information will be transferred as a JPEG file to the fax phone. Therefore, the data interfaces 74 preferably reliably transfer such digital image data without loss or degradation due to noise such as might be created by interference and the like.

The fax phone 20 also preferably includes a blank storage element such as a paper supply, bin or cartridge 82 containing multiple blank sheets or other form of paper supply onto which the color or other photo image will be printed. The paper cartridge 82 is preferably sized and configured so has to support, hold and control the feed of one or only several sizes of paper to be printed. In the preferred embodiment, the paper cartridge holds only four inch by six inch sheets of photo quality paper. The paper cartridge is preferably removable so that the paper supply can be replenished or changed. In a preferred embodiment, the paper cartridge 82 has many of the characteristics of conventional paper cartridges or paper trays such as surfaces to minimize inadvertent disengagement of the tray from the fax phone, lightweight construction, easy alignment and insertion into the fax phone, and easy accessibility for removal or exchange from the fax phone.

The fax phone 20 also includes an opening in the rear wall 32 for accommodating a photo output mechanism 84, which may be part of the printer, described more fully below. The photo output 84 may be as simple as an opening in the housing for a modular attachment at the output of the printer. The photo output 84 can be located at any number of locations on the fax phone, including the front wall 30 of the fax phone, having sufficient room within the housing to accommodate the printer between the cartridge 82 and the output 84.

Figure 5:
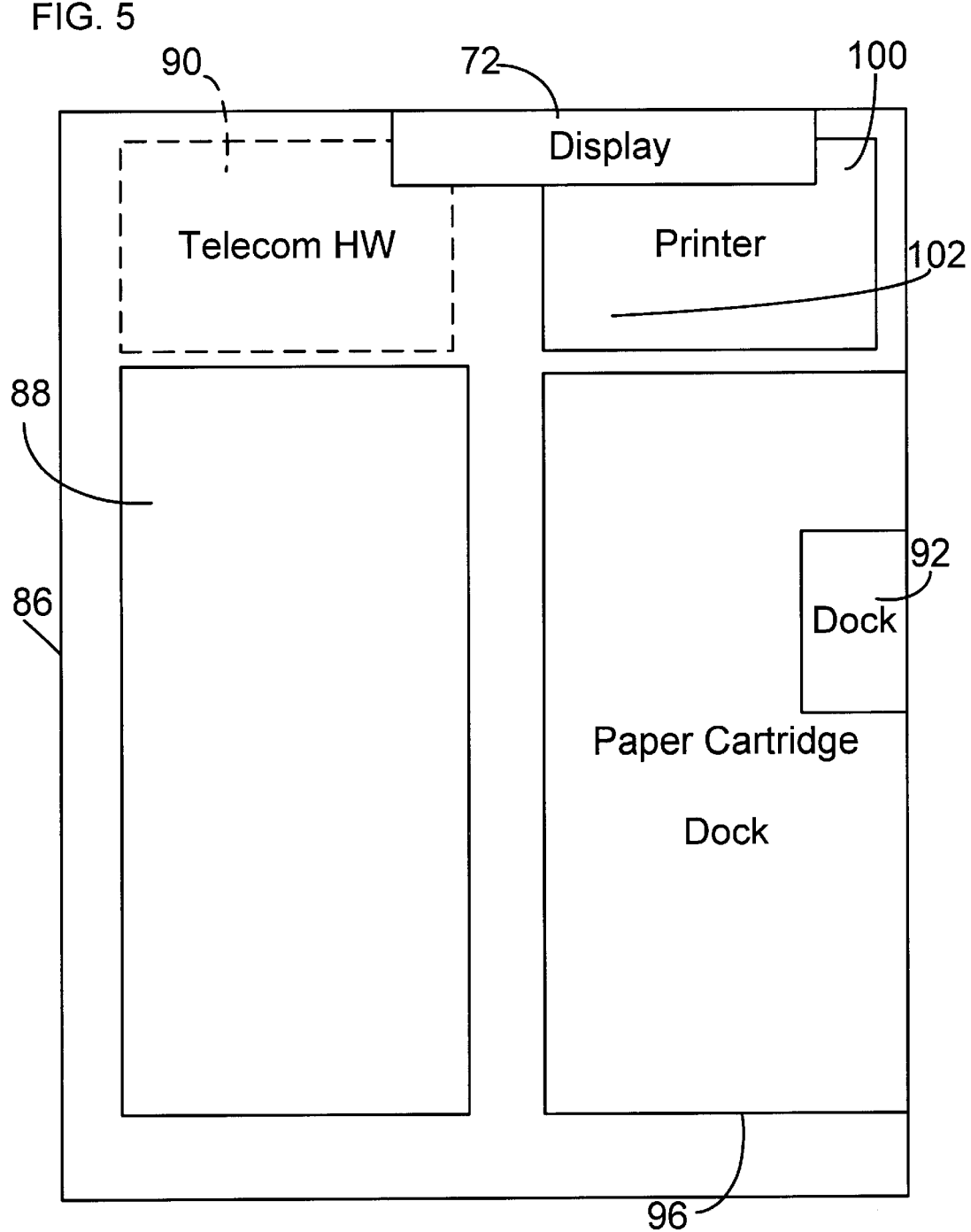
FIG. 5 is a schematic and plan view of hardware for use in the device of FIG. 1.

The fax phone housing will preferably contain all of the electronics used for voice and data communication, in conjunction with the interfaces incorporated on the surfaces of the fax phone. Preferably, the fax phone will appear to the user very much like a conventional desk telephone, so that the user will feel comfortable operating the fax phone and printing photos received from remote locations or from the camera memory module. Internally, the fax phone will include one or more printed circuit boards 86 (FIG. 5), or other supports for the electronics and electro-mechanical hardware used in the phone. The details of the electronics and their interconnections are not shown in FIG. 5 because it is intended to be a block diagram showing the overall components and one possible configuration for those components. In addition to the conventional circuitry, switches and keypad hardware common to modem telephones, depicted generally by the box 88, the permit circuit board will include the telecommunications hardware 90. The telecommunications hardware 90 includes the telecommunications port 42 shown in FIGS. 1 and 3, along with any other hardware used for voice and fax modem communications. The telecommunications hardware 90 includes a switch, solenoid or other electro-mechanical device to connect the processor to the port 42. Preferably, the telecommunications hardware easily handles signals representing color photographic information, such as JPEG files which may vary in size from several hundred thousand bits to over one million bits.

The print circuit board 86 also includes the camera interface hardware 92 for accepting the digital data from the camera memory cartridge or other data storage device. Preferably, the camera interface hardware 92 is identical to the hardware 74 and electrically coupled to the electronics on the printed circuit board to permit reliable and quick transfer of data between memory 58 and the camera memory cartridge 78 (FIG. 2). While it should be-understood that the interface hardware 92 can be mounted directly to the printed circuit board; other methods of supporting the interface hardware 92 can be used. For example, the interface hardware 92 can be supported by the housing and coupled to the printed circuit board through a ribbon cable or other electrical connection. The same is true for the other electrical and electro-mechanical components inside the housing.

The printed circuit board 86 preferably includes the display 72 and associated display drivers and other electronics or firmware conventionally used with displays in conventional telephones. The display 72 can also be mounted directly to the printed certain board or otherwise supported so that data can be provided to the display under control of the processor 56. Typically, the size and complexity of the display determines the location and support used for the display. In the preferred embodiment, the display is sized and configured to permit display of conventional voice telephone data and information as well as such fax and photo printing information as may be desired either simultaneously or based on selections entered on the keypad. For example, the display can be used to indicate the number of images in the camera memory module, which images are selected for storage in memory, which images are to be faxed, and which images are to be printed. The display can also be used to indicate the amount of memory used for each image, the amount of time left to complete a fax transmission, and other similar information. Additionally, part of the display and associated hardware and firmware can be used to control an indicator 94 (FIG. 1) on the print button 68 to indicate that photo images are available to be printed. For example, the indicator 94 can be used to alert the user that a photo image has been received over the fax. The user can then press the print button to print one or more of the photos received. Other indicators can also be included on or adjacent to the printed circuit board to either highlight buttons on a keypad or provide information to the user.

While in most cases the paper cartridge would not necessarily be associated with the printed circuit board 86, a paper cartridge dock 96 is shown occupying part of the space underneath the printed circuit board 86. Paper cartridge dock may take any number of configurations for accepting and supporting the paper cartridge to permit a printer to remove individual sheets of blank paper onto which a photo is to be printed. In one configuration, the paper cartridge dock is defined circumferentially by walls 98 (FIG. 3) in the housing to properly orient the paper cartridge. The dock can also include guides, tracks or rails formed in one or more walls of the housing, such as the base wall 28 to support the cartridge from below. The walls 98 can also serve to limit the amount that the cartridge can be inserted into the housing, by inter-acting with stops or projections (not shown) on the cartridge 82.

The paper cartridge dock is positioned within the housing of the fax telephone adjacent to 80 printer 100 (FIG. 5) so that the printer can selectively pickup and withdraw individual sheets of paper from the paper cartridge and feed the paper through the printer for printing an image. In the preferred embodiment, the printer accepts only blank sheets four inches by six inches in size and produces a photo quality print. Preferably, the printer is configured for only a single print quality or resolution. The printer preferably includes a suitable disposable pen 102 capable of printing 600 dpi with cyan, magenta and yellow ink. The printer may also include ink level gauges for the ink and paper.

A camera suitable for use with the present inventions may be any conventional digital camera or other camera capable of providing digital image formats. The camera may have sufficient resolution and memory to store one mega-pixel worth of image data, or smaller data sizes producable with digital cameras such as CCD cameras. The camera may come with a cable, compact flash capability or infrared image transfer capability for transferring image from the camera to the phone, in addition to the disk or other memory storage medium 78.

In operation, the fax telephones will operate for voice communication the same as conventional telephones. For photo fax communication, digital image files will be transferred from the camera 76 to an available fax phone 20 (FIG. 4) through the removable disk 78. The disk is placed on the interface 74 and the digital information downloaded to the memory 58 under control of the processor 56 or directly through the fax modem 90 and out the phone line 104 to a destination phone 20A dialed up using the keypad on the phone 20. If the digital photo image information is stored in memory, one or more of the images can be selected using the select key 64, the receiving fax phone number entered using the keypad 46 and the images sent by pressing the send key 54. When the images are received by phone 20A, the processor stores the images in memory and sends a signal to the indicator light 94 and/or to the display 72 to indicate that images have been received and are ready to be printed, through a flashing light, steady light or some other appropriate signal. The display can also display the name or telephone number of the sending fax phone. The user at fax phone 20A can then select which images to print using the select key 64 and pressing the print button 68. The processor sends the image information to the printer and a print command so that the printer selects a sheet of blank paper and prints the image on the paper. The printer and any other hardware can be powered through a conventional power cord 105 or other suitable power source.

Using these fax phones, photo images can be taken and immediately sent to others, such as family members in other cities, without having to wait for developing time, mail delays, and the like. Many other applications are available for these fax phones, including real estate applications, law-enforcement and military uses. These fax phones will be easy to use, are low-cost and take up very little space relative to conventional telephones. They can be used to print high-quality color photos taken immediately before using conventional digital cameras. Relatively little training would be needed to operate the units.

Although the present inventions have been described in terms of the preferred embodiments above, the described embodiments of the invention are only considered to be preferred and illustrative of the inventive concepts; the scope of the inventions are not to be limited or restricted to such embodiments. Various and other numerous arrangements and modifications may be devised without departing from the spirit and scope of the inventions. Accordingly, the present invention is not limited to those embodiments precisely shown and described in the specification. It is intended that the scope of the present inventions extends to all such modifications and/or additions.

What is claimed is:

1. An apparatus for sending and receiving a photograph or other image to be printed on a fixed medium, the device comprising:
    a housing;
    a data entry element on a hand-accessible surface of the housing for entering a destination for signals representing an image;
    a wall defining an opening for outputting a medium on which is fixed an image;
    paper storage;
    a connection for receiving JPEG data from a camera storage element;
    an indicator for indicating that digital images are stored and ready for printing; and
    means for controlling the indicator to produce flashing light.

2. The apparatus of claim 1 further comprising means for printing an image on the medium and a print button for causing printing means to print on the medium and wherein the indicator is on the print button.

3. The apparatus of claim 1 further comprising memory for storing signals representing an image.

4. The apparatus of claim 1 further comprising an interface between the housing and a communications line for transmitting signals from and receiving signals in the housing representing images.

5. The apparatus of claim 1 further comprising conversion means for converting signals representing an image into data for controlling a printer for printing an image onto the paper.

6. The apparatus of claim 1 further comprising a printer in the housing for printing an image onto the paper.

7. The apparatus of claim 6 further comprising a feed mechanism for feeding the paper from the storage to the printer.

8. The apparatus of claim 1 further including means for receiving and sending digital image files.

9. The apparatus of claim 8 wherein the receiving and sending means includes a color fax modem.

10. The apparatus of claim 1 further comprising a handset for voice communication.

11. The apparatus of claim 1 wherein the connection for receiving JPEG data is configured so that the JPEG data can be received from outside the housing.

12. The apparatus of claim 11 wherein the connection is mounted in a wall in the housing.

13. The apparatus of claim 12 wherein the connection is adapted for receiving a camera memory module.

14. The apparatus of claim 12 further comprising an interface between the housing and a communications line for transmitting from and receiving into the housing fax communication signals representing images.

15. The apparatus of claim 12 wherein the connection is adapted for receiving a cable from a digital camera.

16. The apparatus of claim 11 wherein the connection is an infrared receiver.

17. The apparatus of claim 1 wherein the apparatus omits any lens for receiving light representing an image to be recorded.

18. An apparatus for sending and receiving a photograph or other image to be printed on a fixed medium, the device comprising:
    a housing;
    a data entry element on a hand-accessible surface of the housing for entering a destination for signals representing an image;
    a wall defining an opening for outputting a medium on which is fixed an image;
    paper storage;
    a connection for receiving JPEG data from a camera storage element;
    an indicator for indicating that digital images are ready for printing; and
    means for controlling the indicator to produce flashing light.

19. The apparatus of claim 18 further including a printer in the housing for printing an image onto the paper.

20. The apparatus of claim 18 further including means for receiving and sending digital image files.

21. The apparatus of claim 20 wherein the receiving and sending means includes a color fax modem.

22. The apparatus of claim 18 wherein the data entry element includes a keypad.

23. The apparatus of claim 22 wherein the keypad includes keys adapted for entering a destination telephone number.

24. The apparatus of claim 22 further including a voice communication handset.

25. The apparatus of claim 18 wherein the connection for receiving JPEG data from a camera storage element is configured so that the JPEG data can be received from outside the housing.

26. The apparatus of claim 25 wherein the connection is mounted in a wall in the housing.

27. The apparatus of claim 26 wherein the connection is adapted for receiving a cable from a digital camera.

28. An apparatus for communicating data representing a photograph or other image to be printed on a fixed medium, the apparatus comprising a housing, a keypad on a hand-accessible surface of the housing for entering data representing a destination for signals representing an image, a wall defining an opening for outputting paper on which is fixed an image, paper storage within the housing for supplying paper on which an image can be fixed, means for applying an image onto paper supplied from the paper storage, a connection for receiving JPEG data from a camera storage element, an indicator for indicating that digital images are ready for printing and means for controlling the indicator to produce flashing light.

* * * * *